United States Patent
Lackner et al.

(10) Patent No.: US 7,799,310 B2
(45) Date of Patent: Sep. 21, 2010

(54) SYSTEMS AND METHODS FOR GENERATING SULFURIC ACID

(75) Inventors: Klaus S. Lackner, Dobbs Ferry, NY (US); Tim A. Rappold, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 12/295,312

(22) PCT Filed: Apr. 5, 2007

(86) PCT No.: PCT/US2007/066103

§ 371 (c)(1),
(2), (4) Date: Mar. 16, 2009

(87) PCT Pub. No.: WO2007/118172

PCT Pub. Date: Oct. 18, 2007

(65) Prior Publication Data

US 2009/0220405 A1    Sep. 3, 2009

Related U.S. Application Data

(60) Provisional application No. 60/790,386, filed on Apr. 7, 2006.

(51) Int. Cl.
*B01J 10/00* (2006.01)
*C01B 17/69* (2006.01)
*C01B 17/74* (2006.01)

(52) U.S. Cl. ........... 423/522; 423/431; 423/529; 423/539; 423/542; 423/555; 423/648.1; 422/160; 422/161; 422/187

(58) Field of Classification Search ........... 205/334, 205/343, 361, 471, 496; 422/160, 161, 187; 423/431, 522, 529, 539, 542, 555, 648.1; 429/17, 19, 20, 21
See application file for complete search history.

(56) References Cited

U.S. PATENT DOCUMENTS

| 3,655,547 | A | 4/1972 | Lyons, Jr. |
| 4,379,489 | A | 4/1983 | Rollmann |
| 4,797,186 | A | 1/1989 | Levy et al. |
| 4,830,718 | A | 5/1989 | Stauffer |
| 5,096,054 | A | 3/1992 | Scherson |

(Continued)

*Primary Examiner*—Timothy C Vanoy
(74) *Attorney, Agent, or Firm*—Wiggin and Dana LLP; Anthony P. Gangemi

(57) ABSTRACT

Methods and systems for generating sulfuric acid (102) are disclosed. In some embodiments, the method includes combusting a sulfur-containing material (114) with a gas including oxygen (116) to produce a first stream of sulfur dioxide (118), mixing water with the first stream of sulfur dioxide to produce a mixed stream, using an energy, electrolytically converting (108) the mixed stream of sulfur dioxide and water into sulfuric acid (102) and hydrogen (122), generating a source of energy (126) from the hydrogen, and providing the source of energy as at least a portion of the energy for electrolytically converting the first stream of sulfur dioxide and water into sulfuric acid and hydrogen. In some embodiments, the system includes a first chamber for combusting a sulfur-containing material to produce a first stream of sulfur dioxide, an electrolytic cell (108) for converting the first stream into sulfuric acid and hydrogen, and a fuel cell (112) for generating an energy source from the hydrogen.

26 Claims, 3 Drawing Sheets

U.S. PATENT DOCUMENTS 6,660,417 B1 12/2003 Nishio et al.
7,097,392 B2 8/2006 Stecher
7,169,493 B2 1/2007 Molter et al.
7,595,035 B2 * 9/2009 Hommeltoft et al. ........ 423/522

* cited by examiner

US 7,799,310 B2

SYSTEMS AND METHODS FOR GENERATING SULFURIC ACID

CROSS REFERENCE TO RELATED APPLICATION(S)

This application claims the benefit of U.S. Provisional Application No. 60/790,386, filed Apr. 7, 2006, which is incorporated by reference as if disclosed herein in its entirety.

BACKGROUND

Considering the present state and future projections for sulfur consumption, large amounts of excess sulfur, e.g., 80 Mt worldwide in the next twenty years, might be accumulated in many areas of the world. For example, supply of recovered sulfur is already outpacing the demand for sulfur in energy-rich regions such as Alberta, Canada, and west Kazakhstan. Such outpacing of the supply of sulfur relative to the demand for sulfur is expected to occur globally and will cause the need for large scale storage of waste sulfur or sulfur products.

However, stockpiles of elemental sulfur are unsafe. For example, sulfur dust can settle near storage sites and acidify the surrounding soil. Acidification and the metals leached from the soil and transported to other locations can cause significant environmental damage, such as drastic changes in local water and soil pH. In addition, long-term sulfur storage poses significant risk of ignition and sulfur fires, as well as the potential for bacterial degradation and oxidation.

Despite such risks and concerns, suitable solutions to safe, e.g., low solubility in water, noncombustible, and reasonably resistant to bacterial digestion, long-term storage of sulfur are not currently available. For example, one method essentially provides a disposal strategy wherein sour gases, i.e., gas mixtures including substantial amounts of acidic gases like hydrogen sulfide ($H_2S$), sulfur dioxide ($SO_2$), sulfur trioxide ($SO_3$), and carbon dioxide ($CO_2$), are re-injected underground. However, this method poses environmental risks because these sour gases might escape over time and be reintroduced into the environment causing ecological damage. For example, acid gas can react with well plugs that are typically made of concrete and escape over time. Other forms of leakage are possible insofar as reservoirs can develop leaks over time.

SUMMARY

Methods for generating sulfuric acid are disclosed. In some embodiments, the method includes the following: combusting a sulfur-containing material with a gas including oxygen to produce a first stream of sulfur dioxide; mixing water with the first stream of sulfur dioxide to produce a mixed stream; using an energy, electrolytically converting the mixed stream of sulfur dioxide and water into sulfuric acid and hydrogen; generating a source of energy from the hydrogen; and providing the source of energy as at least a portion of the energy for electrolytically converting the first stream of sulfur dioxide and water into sulfuric acid and hydrogen.

Systems for generating sulfuric acid are disclosed. In some embodiments, the system includes the following: a first chamber for combusting a sulfur-containing material with a gas including oxygen to produce a first stream of sulfur dioxide; an electrolytic cell for converting the first stream of sulfur dioxide and water into sulfuric acid and hydrogen; and a fuel cell for generating an energy source from at least a portion of the hydrogen, wherein the energy source at least partially serves as driving energy for the electrolytic cell.

Systems for generating sulfuric acid are disclosed. In some embodiments, the system includes the following: means for combusting a sulfur-containing material with a gas including oxygen to produce a first stream of sulfur dioxide; means for converting the first stream of sulfur dioxide and water from into sulfuric acid and hydrogen; and means for generating a first energy source from at least a portion of the hydrogen, wherein the first energy source at least partially serves as driving energy for the electrolytic cell.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Generally, the disclosed subject matter relates to systems and methods for generating sulfuric acid from sulfur-containing materials that are in an unstable state. As discussed further below, as used herein, the terms "unstable and stable state" refer to a thermodynamically stable state. The sulfuric acid generated can later be combined with other materials to produce sulfur-containing materials that are in a stable state, thus providing an alternative for safe and long-term storage, disposal, and/or sale of sulfur-containing materials.

Figure 1:
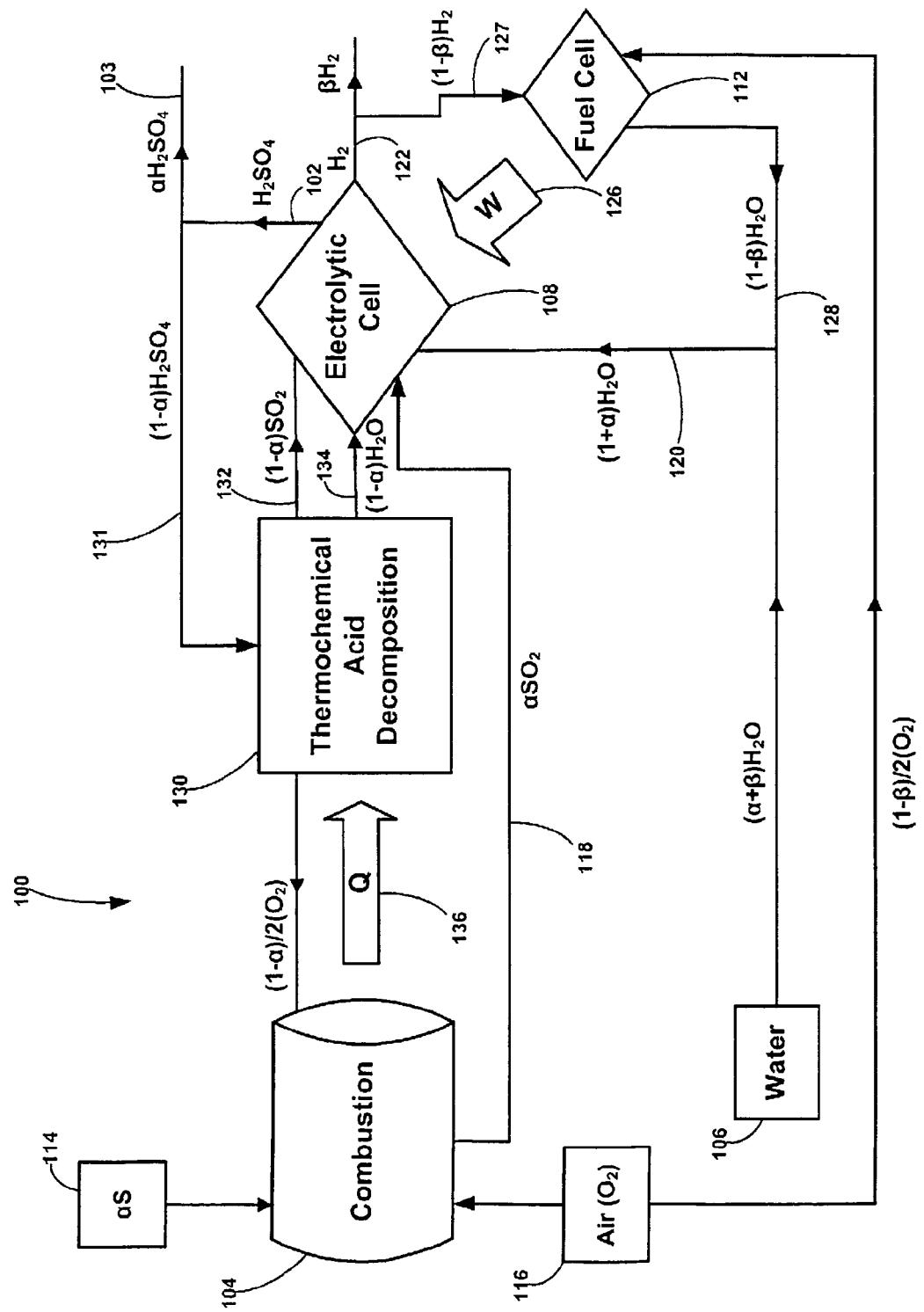
FIG. 1 is a diagram of a system for producing hydrogen and sulfuric acid according to some embodiments of the disclosed subject matter.

Referring now to FIG. 1, one embodiment of the disclosed subject matter is a system 100 for generating sulfuric acid, i.e., $H_2SO_4$ 102. At least a portion 103 of $H_2SO_4$ 102 can later be combined with other materials to produce sulfur-containing materials that are in a stable state. System 100 generally includes a first chamber 104, a water source 106, an electrolytic cell 108, and a fuel cell 112.

First chamber 104 can include combustion chambers known by those of ordinary skill in the art to be suitable for combustion of sulfur-containing materials with gases. System 100 includes first chamber 104 for combusting a sulfur-containing material 114 with a gas 116 including oxygen to produce a first stream of sulfur dioxide 118.

Electrolytic cell 108 is used for converting first stream of sulfur dioxide 118 and a water 120 at least partially from water source 106 into sulfuric acid 102 and hydrogen 122. System 100 includes an energy W for driving electrolytic cell 108. In some embodiments, an external energy source (not shown) can at least partially serve as energy W for driving electrolytic cell 108.

Fuel cell 112 generates an energy source 126 from at least a portion 127 of hydrogen 122. Energy source 126 can at least partially serve as energy W for driving electrolytic cell 108. Fuel cell 112 is generally configured to generate a water 128, of which an amount can serve as at least a portion of water 120.

In some embodiments, system 100 can include a second chamber 130 for decomposing at least a portion 131 of sulfuric acid 102 generated by electrolytic cell 108 into a second stream of sulfur dioxide 132 and a water 134. In some embodiments, second chamber is configured to conduct thermochemical acid decomposition to decompose sulfuric acid 102. Electrolytic cell 108 is generally configured to generate sulfuric acid and hydrogen from second stream of sulfur dioxide 132 and water 134. First chamber 104 is generally configured to generate a second energy source 136 to provide an energy Q for driving the thermochemical acid decomposition.

Figure 2:
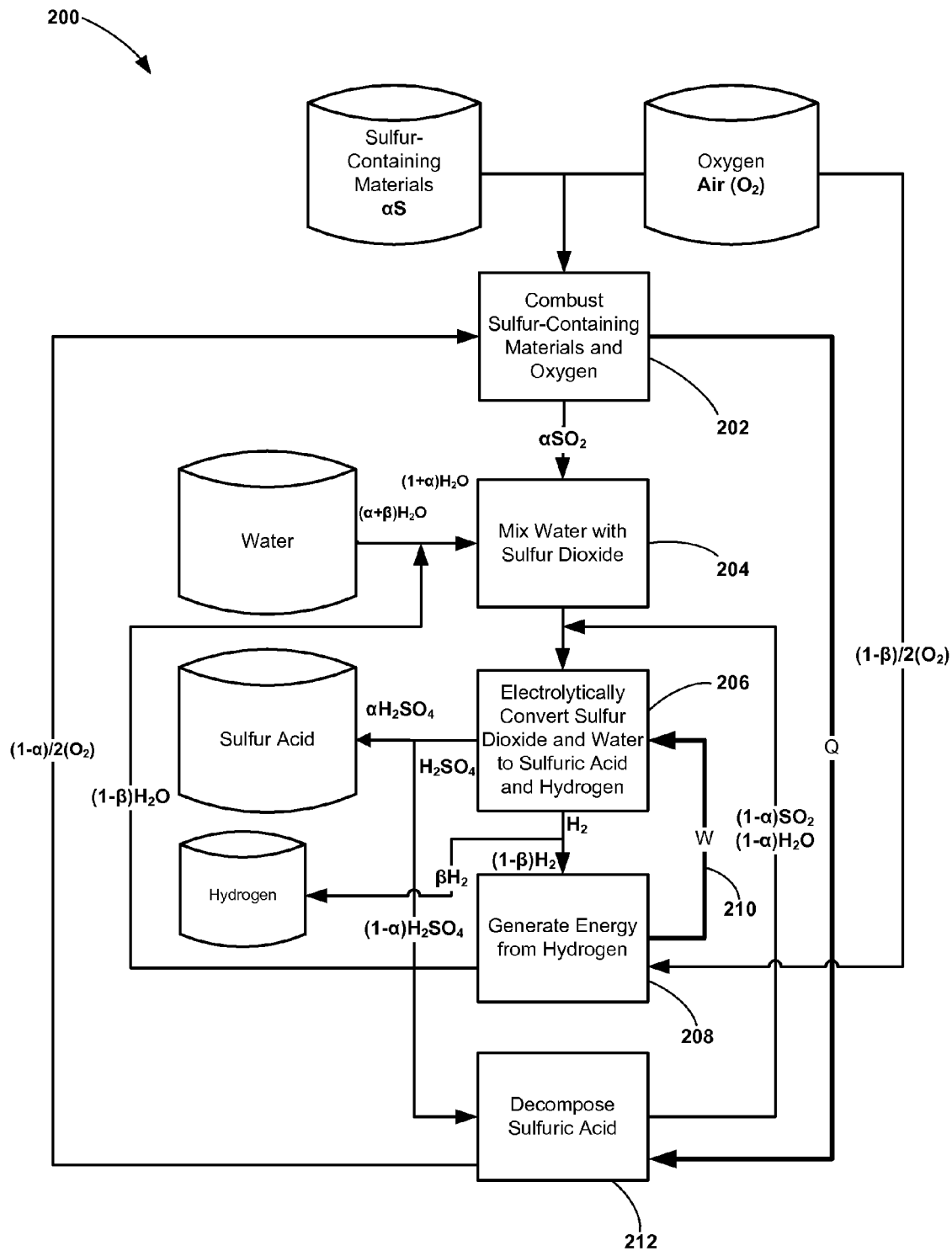
FIG. 2 is a diagram of a method for producing hydrogen and sulfuric acid according to some embodiments of the disclosed subject matter.

Referring now to FIG. 2, one embodiment of the disclosed subject matter includes a method 200 for generating sulfuric acid. At 202, a sulfur-containing material and a gas including oxygen is combusted to produce a first stream of sulfur dioxide. At 204, water is mixed with the first stream of sulfur dioxide to produce a mixed stream. At 206, an energy is used to electrolytically convert the mixed stream of sulfur dioxide and water into sulfuric acid and hydrogen. At 208, a source of energy is generated from the hydrogen and water, which can be used at 204, can be produced. At 210, the source of energy is provided as at least a portion of the energy for electrolytically converting the mixed stream of sulfur dioxide and water into sulfuric acid and hydrogen. At 212, an amount of the sulfuric acid is decomposed into a second stream of sulfur dioxide and water. Thermochemical acid decomposition can be used to decompose the sulfuric acid. Energy for driving the thermochemical acid decomposition can be generated at 202. Alternatively, an external source of energy can be provided to drive the thermochemical acid decomposition. At 206, the second stream of sulfur dioxide and water is converted into sulfuric acid and hydrogen.

Figure 3:
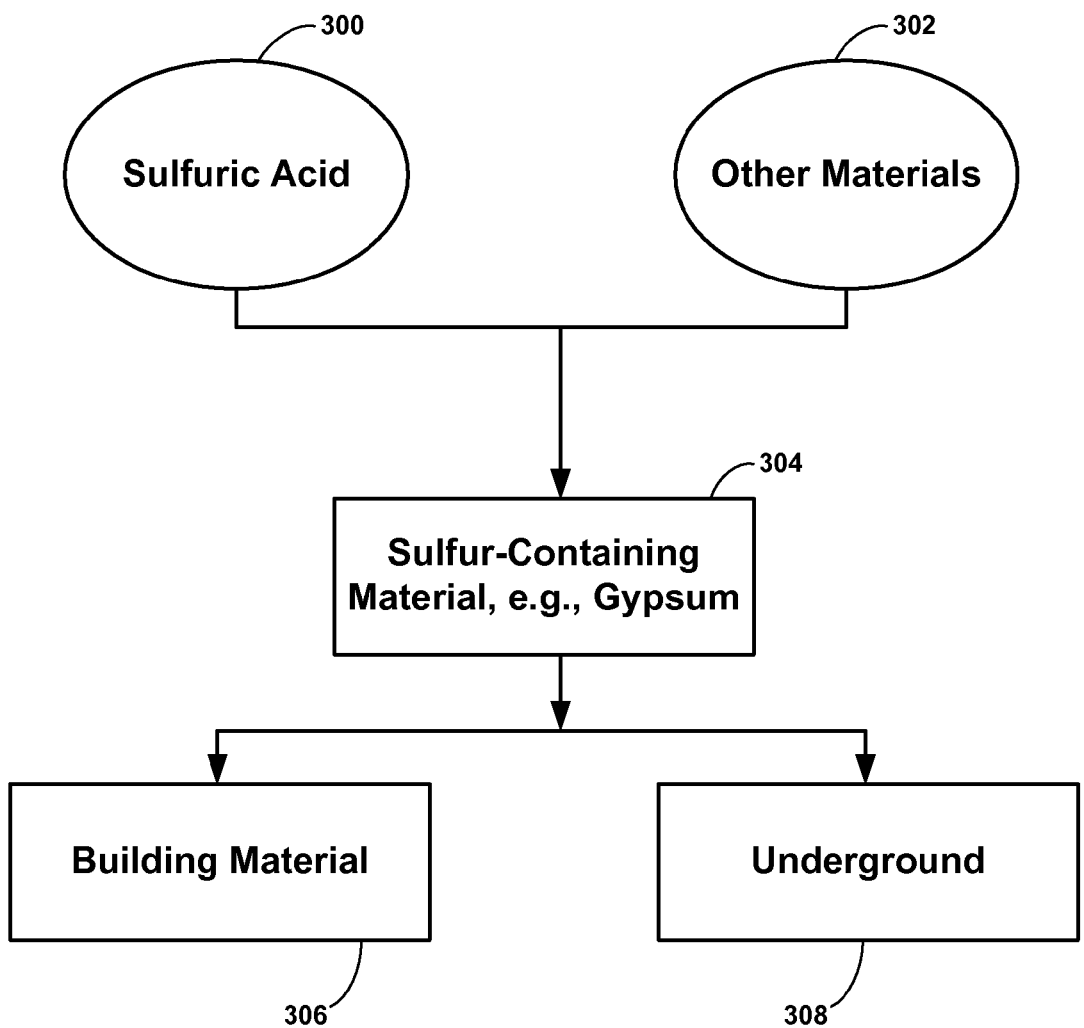
FIG. 3 is a diagram of methods for producing a stable sulfur-containing material according to some embodiments of the disclosed subject matter.

Referring now to FIG. 3, method 200 can also include combining sulfuric acid 300 with other materials 302 to produce a sulfur-containing material 304 having a thermodynamically stable state, e.g., gypsum or similar. Other materials 302 can include calcium carbonate, serpentine, or the like. Sulfur-containing material 304 can be used as a building material 306 or disposed of underground as a thermodynamically stable waste 308.

Some embodiments of the disclosed subject matter include a method for recycling a waste material containing sulfur. The method includes the following steps: providing a supply of a waste material containing sulfur, the waste material including a free energy and a susceptibility to at least one type of ecological pollution in the presence of natural atmospheric conditions; providing at least one reacting material; and chemically reacting the waste material with the at least one reacting material so as to generate a solid recycled waste material containing sulfur, the solid recycled waste material having a reduced free energy and a resistance to the at least one type of ecological pollution in the presence of the natural atmospheric conditions. In some embodiments, the waste material is susceptible to dissolution in solvents occurring in natural atmospheric conditions so as to form at least one of acids and gases capable of leaching into and polluting water and soil, and the recycled waste material is resistant to such dissolution. In some embodiments, the waste material is susceptible to combustion in natural atmospheric conditions so as to produce gases capable of polluting atmosphere, and the recycled waste material is resistant to such combustion. The recycled waste material generated is substantially inert to dissolution combustion.

The thermal energy utilized in driving methods according to the disclosed subject matter can be derived from the combustion of sulfur (S) according to reaction [1]:

$$S + O_2 \rightarrow SO_2. \tag{1}$$

Referring again to FIGS. 1 and 2, α represents the sulfur fuel feed rate into first chamber 104.

A first stream of sulfur dioxide ($SO_2$) 118 generated from reaction [1] can be fed to electrolytic cell 108, where hydrogen ($H_2$) 122 and sulfuric acid ($H_2SO_4$) 102 can be formed according to reaction [2]:

$$SO_2 + 2H_2O \rightarrow H_2 + H_2SO_4. \tag{2}$$

In FIGS. 1 and 2, α also represents the net sulfuric acid production rate and β represents the net hydrogen production rate.

Reaction [2] is endothermic and utilizes energy W in the form of electrical work to drive the reaction. In certain embodiments, as shown in FIGS. 1 and 2, W can be supplied by fuel cell 112 that is driven by a portion 127 of $H_2$ 122 generated in reaction [2]. Electricity can be generated by fuel cell 112 according to reaction [3]:

$$H_2 + \frac{1}{2}O_2 \longrightarrow H_2O + \text{electricity}. \tag{3}$$

In some embodiments, a fraction 127 of $H_2$ 122 generated in reaction [2] can be supplied to fuel cell 112. For example, about 20-30% of the generated $H_2$ 122 can be supplied to fuel cell 112.

A fraction 131 of $H_2SO_4$ 102 generated in reaction [2] can be thermally decomposed in a second chamber 130, e.g., a thermal decomposer, to regenerate a second stream of $SO_2$ 132 as shown in reaction [4]:

$$H_2SO_4 \longrightarrow SO_2 + H_2O + \frac{1}{2}O_2. \tag{4}$$

For example, about 40-50% of $SO_2$ 118 that is oxidized according to reaction [2] can be regenerated in second chamber 130, which can then be fed to electrolytic cell 108 as shown in FIGS. 1 and 2.

Some embodiments of the disclosed subject matter provide methods for generating hydrogen ($H_2$) and sulfuric acid ($H_2SO_4$) that can be powered by sulfur combustion. In such embodiments, the heat release of the sulfur combustion can determine the recycle rate (1−α). That is, the enthalpies of reactions [1] and [4] can be matched. For example, if reaction [1] occurs in the presence of air, the combustion temperature can be increased by the supply of oxygen ($O_2$) from reaction [4].

As mentioned above, in FIGS. 1 and 2, α represents the sulfur fuel feed rate and the net sulfuric acid production rate, (1−α) represents the recycle rate of the sulfuric acid, and β represents the net hydrogen production rate. Hence, β/α represents the molar $H_2$:S ratio. For example, for α=0.48 and β=0.72, β/α is 3/2 meaning 3 moles of $H_2$ is produced per mole of S.

In some embodiments, α is from about zero to about 1. If α is zero, no sulfur is combusted. If α=1, no material either enters or leaves second chamber 104. Hence, all of the sulfur dioxide ($SO_2$) obtained by reaction [1] is fed into electrolytic cell 108 and, as described above, the heat generated during combustion can be utilized to generate energy W, e.g., electricity. The generated electricity can further be used to drive electrolytic cell 108. As one skilled in the art will appreciate, the desired value of α is related to the desired amount of energy W to be generated.

In some embodiments, β is from about zero to about 1. If β=0, all of hydrogen gas 122 generated in electrolytic cell 108 can be supplied to drive fuel cell 112. However, if β=1, no hydrogen is supplied to fuel cell 112 and the electricity utilized to drive electrolytic cell 108 can be supplied by an external source (not shown). As one skilled in the art will appreciate, the desired value of β is related to the power requirements and availability of power to drive electrolytic cell 108.

FIGS. 1 and 2 illustrate embodiments of systems and methods operating under steady state. However, operation of systems and methods according to the disclosed subject matter during ramp-up will be readily apparent to one of ordinary skill in the art. For example, in the initial stages where water ($H_2O$) is not generated by reaction [3] or reaction [4], an external supply of water 106 can be provided to electrolytic cell 108 to ramp up the operation.

In alternative embodiments of the disclosed subject matter, sulfur (S) can be substituted with hydrogen sulfide ($H_2S$), wherein the combustion of $H_2S$ with $O_2$ generates water ($H_2O$) in addition to the sulfur dioxide ($SO_2$) as shown in reaction [5]:

$$2H_2S + 3O_2 \rightarrow 2SO_2 + 2H_2O. \quad [5]$$

In this case, the method can be further modified to route the generated $H_2O$ from first chamber 104, e.g., a combustion chamber, to electrolytic cell 108.

As used herein, the term "stable state" refers to a thermodynamically stable state. Generally, the thermodynamic state of a material is measured by the material's overall free energy:

$$G = H - TS, \quad [6]$$

where G is the Gibbs free energy, H is enthalpy, S is entropy, and T is temperature. Generally, lower values of G correspond to more thermodynamically stable states. For example, thermodynamically stable states can include the thermodynamic ground state or a thermodynamic metastable equilibrium state.

Some embodiments of the disclosed subject matter relate to methods and systems for reacting a material containing reduced sulfur with one or more reacting materials to produce a material containing oxidized sulfur. In some embodiments, oxidized sulfur can be in a thermodynamically stable state. Material containing reduced sulfur and material containing oxidized sulfur can be, independent of each other, in a solid, liquid, or a gas form.

For sulfur-containing materials, sulfate compounds can correspond to materials having a thermodynamically stable state. For example, Table 1 shows the relative free energy values for elemental sulfur (S), sulfur dioxide ($SO_2$), sulfur trioxide ($SO_3$), sulfuric acid ($H_2SO_4$), and calcium sulfate ($CaSO_4$).

TABLE 1

| Compound | Gibb's Free Energy for Each Reaction (kJ/mol S) | Cumulative Free Energy (kJ/mol S) |
|---|---|---|
| sulfur (S) to sulfur dioxide (($SO_2$)) | 300 | 587 |
| sulfur dioxide ($SO_2$) to sulfur trioxide ($SO_3$) | 71 | 287 |
| sulfur trioxide ($SO_3$) to sulfuric acid ($H_2SO_4$) | 82 | 216 |
| sulfuric acid ($H_2SO_4$) to calcium sulfate ($CaSO_4$) | 134 | 134 |

As shown in Table 1, S has the highest cumulative free energy, e.g., followed by $SO_2$, $SO_3$, $H_2SO_4$, and $CaSO_4$. Hence, as shown in the example of Table 1, $CaSO_4$ can be deemed to have a thermodynamically stable state as compared to other sulfur-containing materials. Although Table 1 includes the standard-state Gibbs' free energies, it would be readily apparent to one of ordinary skill in the art to calculate the appropriate Gibbs' free energies for particular desired reaction conditions, e.g., 0.2 atm of oxygen as found in air.

Table 2 shows the relative enthalpy values for elemental sulfur (S), sulfur dioxide ($SO_2$), sulfur trioxide ($SO_3$), sulfuric acid ($H_2SO_4$), and calcium sulfate ($CaSO_4$).

TABLE 2

| Compound | Enthalpies for Each Step (kJ/mol S) |
|---|---|
| sulfur (S) to sulfur dioxide ($SO_2$) | 297 |
| sulfur dioxide ($SO_2$) to sulfur trioxide ($SO_3$) | 99 |
| sulfur trioxide ($SO_3$) to sulfuric acid ($H_2SO_4$) | 133 |
| sulfuric acid ($H_2SO_4$) to calcium sulfate ($CaSO_4$) | 49 |

As shown, S has the highest value of enthalpy, followed by $SO_2$, $SO_3$, $H_2SO_4$, and $CaSO_4$. Hence, release of heat in converting S to $SO_2$, $SO_2$ to $SO_3$, $SO_3$ to $H_2SO_4$, and $H_2SO_4$ to $CaSO_4$ is exothermic and the heat generated during the reaction can, for example, be utilized to provide heat to a working fluid (e.g., to boil water).

As mentioned above, in some embodiments, the material containing oxidized sulfur and having a thermodynamically stable state than the original sulfur-containing material can be in a solid form. Solid disposal can be more environmentally safe than gaseous or liquid disposal as solid disposal can allow for containment rather than dilution into the environment. For example, the material containing oxidized sulfur can be in its thermodynamic ground state. Moreover, the solid material containing oxidized sulfur having a thermodynamically stable state can be resistant to dissolution in solvents commonly found in the environment such as water. For example, the material containing oxidized sulfur can include Na-, K-, Ca-, and/or Mg-bearing sulfate minerals having a thermodynamically stable state. The material containing oxidized sulfur can also include Na-, K-, Ca-, and/or Mg-bearing silicate minerals having a thermodynamically stable state. Particular examples of the material containing oxidized sulfur include the following:

| | |
|---|---|
| $CaSO_4$ | $K_2Mg(SO_4)_2 \cdot 4(H_2O)$ |
| $CaSO_4 \cdot 2H_2O$ | $MgSO_4 \cdot 6H_2O$ |
| $K_2SO_4 \cdot CaSO_4 \cdot H_2O$ | $MgSO_4 \cdot 5H_2O$ |
| $2(CaSO_4) \cdot K_2SO_4 \cdot MgSO_4 \cdot 2H_2O$ | $MgSO_4 \cdot 4H_2O$ |
| $Na_2SO_4 \cdot CaSO_4$ | $MgSO_4 \cdot H_2O$ |
| $K_2SO_4$ | $CaSiO_3$ |
| $MgSO_4$ | $MgSiO_3$ |
| $MgSO_4 \cdot 7H_2O$ | $NaCa_2Si_3O_8(OH)$ | and the like.

In some embodiments, the materials containing reduced sulfur can be in a solid, liquid, or gas form. For example, the materials containing reduced sulfur can include elemental sulfur, gases containing reduced sulfur, liquids containing reduced sulfur, compounds containing reduced sulfur, and the like. Examples of the materials containing reduced sulfur can include S, $H_2S$, $SO_2$, and the like.

The one or more reacting materials include materials that can suitably react with the material containing reduced sulfur to produce the material containing oxidized sulfur having a thermodynamically stable state mentioned above. For example, the reacting material can include $Na_2CO_3$, $K_2CO_3$, $CaCO_3$, $MgCO_3$, $Mg_3Si_2O_5(OH)_4$, $Mg_3Si_4O_{10}(OH)_2$, and the like.

For example, as illustrated in and described with respect to FIG. 3, some embodiments of the disclosed subject matter include reacting sulfuric acid ($H_2SO_4$) with calcium carbonate ($CaCO_3$) to produce gypsum ($CaSO_4.2H_2O$) and carbon dioxide ($CO_2$):

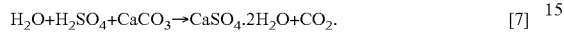

$$H_2O + H_2SO_4 + CaCO_3 \rightarrow CaSO_4.2H_2O + CO_2. \qquad [7]$$

As this combustion reaction is exothermic, heat and power can be generated, which can be harnessed for electricity generation. Moreover, the resulting gypsum ($CaSO_4.2H_2O$) is stable under atmospheric conditions and can be easily disposed of or even utilized in various industrially applicable setting, such as building materials.

In some embodiments, sulfuric acid ($H_2SO_4$) can be reacted with serpentine ($Mg_3Si_2O_5(OH)_4$), which among other by-products can generate $MgSO_4$:

$$3H_2SO_4 + Mg_3Si_2O_5(OH)_4 \rightarrow 3MgSO_4 + 2SiO_2 + 5H_2O. \qquad [8]$$

Utilization of acidic solvents such as $H_2SO_4$ on serpentine can yield energy without creating harmful emissions such as $CO_2$. Utilization of intermediate compound $H_2SO_4$ can overcome potentially slow kinetics of mineral carbonation of serpentines, and the formation of sulfate compounds can proceed rapidly. Although $MgSO_4$ can have a sufficient thermodynamically stable state, a material having a more thermodynamically stable state can be generated by reacting $MgSO_4$ with $CaCO_3$ to obtain $CaSO_4$ and $MgCO_3$. The resulting materials can both be stored or disposed underground or sold or utilized in industrial settings, e.g., used as a building material.

The use of sulfuric acid to produce a thermodynamically stable sulfur-containing material offer benefits over other known other methods. For example, if $H_2SO_4$ is utilized, there is no longer a need for calcination of $CaCO_3$ to generate gypsum. In addition, the highly reactive nature of $H_2SO_4$ can adequately ensure that the final sulfur-containing material having a thermodynamically stable state is sufficiently formed.

The reactions involved with transforming thermodynamically unstable sulfur-containing materials to stable materials are well developed and can be optimized for electricity generation. For example, heat of 16.5 GJ/t of sulfur (S) is generated in making $H_2SO_4$. For a 1000 ton S/day plant, 190 MW of heat are theoretically produced. A typical sulfuric acid generation plant typically generates 4.4 GJ of electricity per ton of sulfur. This amounts to a 50 MW electricity generation translating to about 26% efficiency.

Sulfuric acid ($H_2SO_4$) can be contacted with $CaCO_3$ by injecting the H2SO4 underground (even into large $CaCO_3$ formations) to generate gypsum as opposed to batch conversion in a processing plant. This can replace heavy mining operations with potentially efficient geo-engineering methods.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method for generating sulfuric acid, the method comprising:
   combusting a sulfur-containing material with a gas including oxygen to produce a first stream of sulfur dioxide;
   mixing water with the first stream of sulfur dioxide to produce a mixed stream;
   using an energy, electrolytically converting the mixed stream of sulfur dioxide and water into sulfuric acid and hydrogen;
   generating a source of energy from the hydrogen; and
   providing the source of energy as at least a portion of the energy for electrolytically converting the first stream of sulfur dioxide and water into sulfuric acid and hydrogen.

2. The method according to claim 1, further comprising:
   using thermochemical acid decomposition, decomposing an amount of the sulfuric acid into a second stream of sulfur dioxide and water.

3. The method according to claim 2, further comprising:
   generating a source of energy for driving the thermochemical acid decomposition.

4. The method according to claim 2, further comprising:
   electrolytically converting the second stream of sulfur dioxide and water into sulfuric acid and hydrogen.

5. The method according to claim 1, further comprising:
   combining the sulfuric acid with at least one other material to produce a sulfur-containing material having a thermodynamically stable state.

6. The method according to claim 5, wherein the at least one other material include calcium carbonate.

7. The method according to claim 5, wherein the at least one other material include serpentine.

8. The method according to claim 5, wherein the sulfur-containing material includes at least one of calcium sulfate and magnesium sulfate.

9. A system for generating sulfuric acid, the system comprising:
   a first chamber for combusting a sulfur-containing material with a gas including oxygen to produce a first stream of sulfur dioxide;
   an electrolytic cell for converting the first stream of sulfur dioxide and water into sulfuric acid and hydrogen; and
   a fuel cell for generating an energy source from at least a portion of the hydrogen, wherein the energy source at least partially serves as driving energy for the electrolytic cell.

10. The system of claim 9, further comprising a water source for providing water to the system.

11. The system of claim 9, further comprising an energy for driving the electrolytic cell.

12. The system of claim 9, further comprising an external energy source that at least partially serves as the energy for driving the electrolytic cell.

13. The system of claim 9, wherein the fuel cell is configured to generate water, of which an amount serves as at least a portion of the water utilized by the electrolytic cell.

14. The system of claim 9, further comprising:
    a second chamber for decomposing at least a portion of the sulfuric acid generated by the electrolytic cell into a second stream of sulfur dioxide and water.

15. The system of claim 14, wherein the second chamber is configured to conduct thermochemical acid decomposition therein.

16. The system of claim 14, wherein the electrolytic cell is configured to generate sulfuric acid and hydrogen from the second stream of sulfur dioxide and the water generated by the second chamber.

17. The system of claim 15, wherein the first chamber is configured to generate a second energy source to provide energy for driving the thermochemical acid decomposition.

18. A system for generating sulfuric acid, the system comprising:
- means for combusting a sulfur-containing material with a gas including oxygen to produce a first stream of sulfur dioxide;
- means for converting the first stream of sulfur dioxide and water from into sulfuric acid and hydrogen; and
- means for generating a first energy source from at least a portion of the hydrogen, wherein the first energy source at least partially serves as driving energy for an electrolytic cell.

19. The system of claim 18, further comprising a water source for providing water to the system.

20. The system of claim 18, further comprising an energy for at least partially driving the means for converting.

21. The system of claim 18, wherein the means for converting includes an electrolytic cell.

22. The system of claim 18, wherein the means for generating includes a fuel cell.

23. The system of claim 18, further comprising:
- a second chamber for decomposing at least a portion of the sulfuric acid generated by the electrolytic cell into a second stream of sulfur dioxide and water.

24. The system of claim 23, wherein the second chamber is configured to conduct thermochemical acid decomposition therein.

25. The system of claim 23, wherein the electrolytic cell is configured to generate sulfuric acid and hydrogen from the second stream of sulfur dioxide and the water generated by the second chamber.

26. The method according to claim 8, further comprising:
- reacting magnesium sulfate with calcium carbonate to obtain calcium sulfate and magnesium carbonate.

* * * * *